J. S. TOWNSEND.
POWER CABLE REELING MECHANISM FOR SELF PROPELLED MACHINES.
APPLICATION FILED APR. 13, 1921.
1,423,889.
Patented July 25, 1922.
2 SHEETS—SHEET 1.
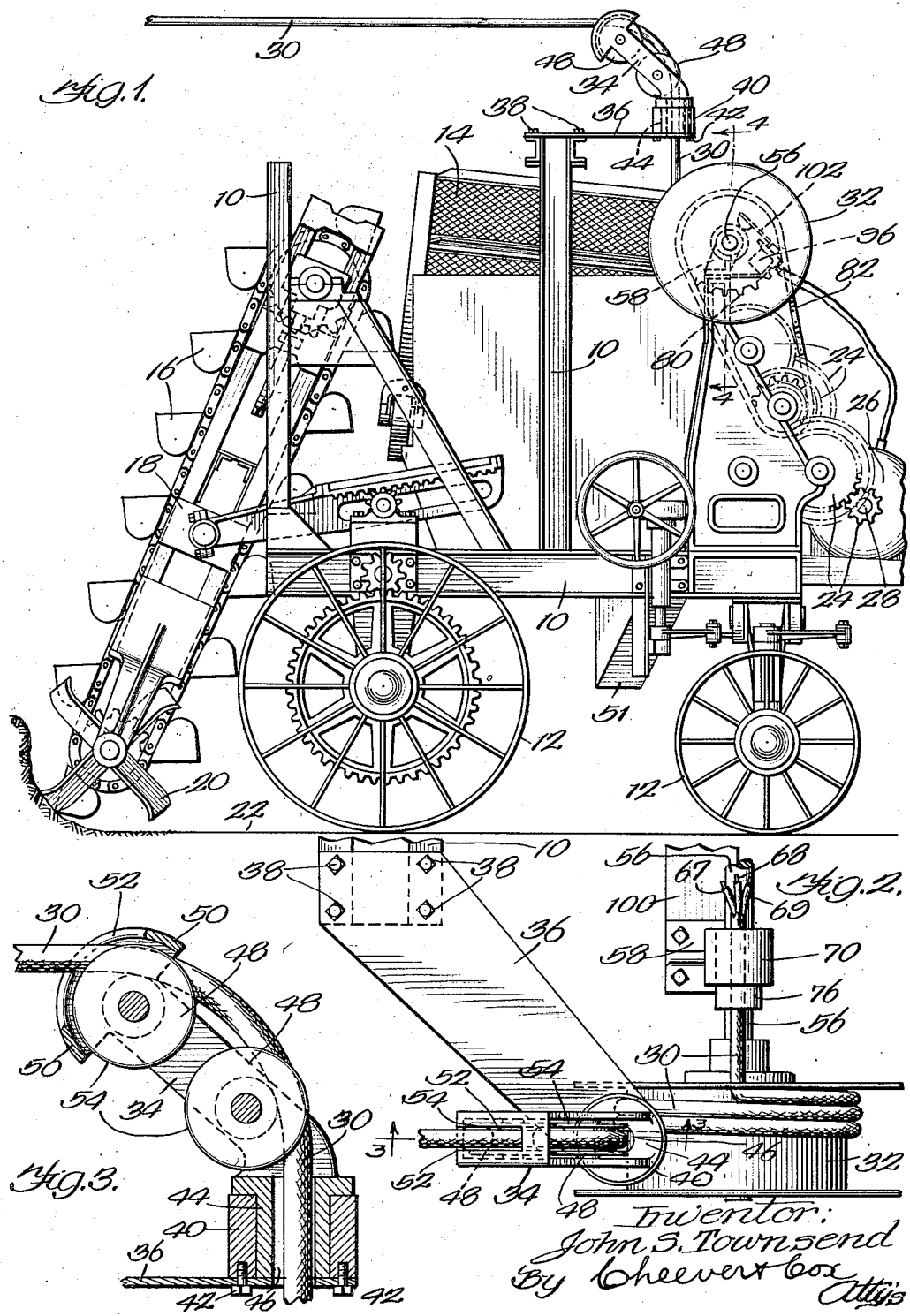

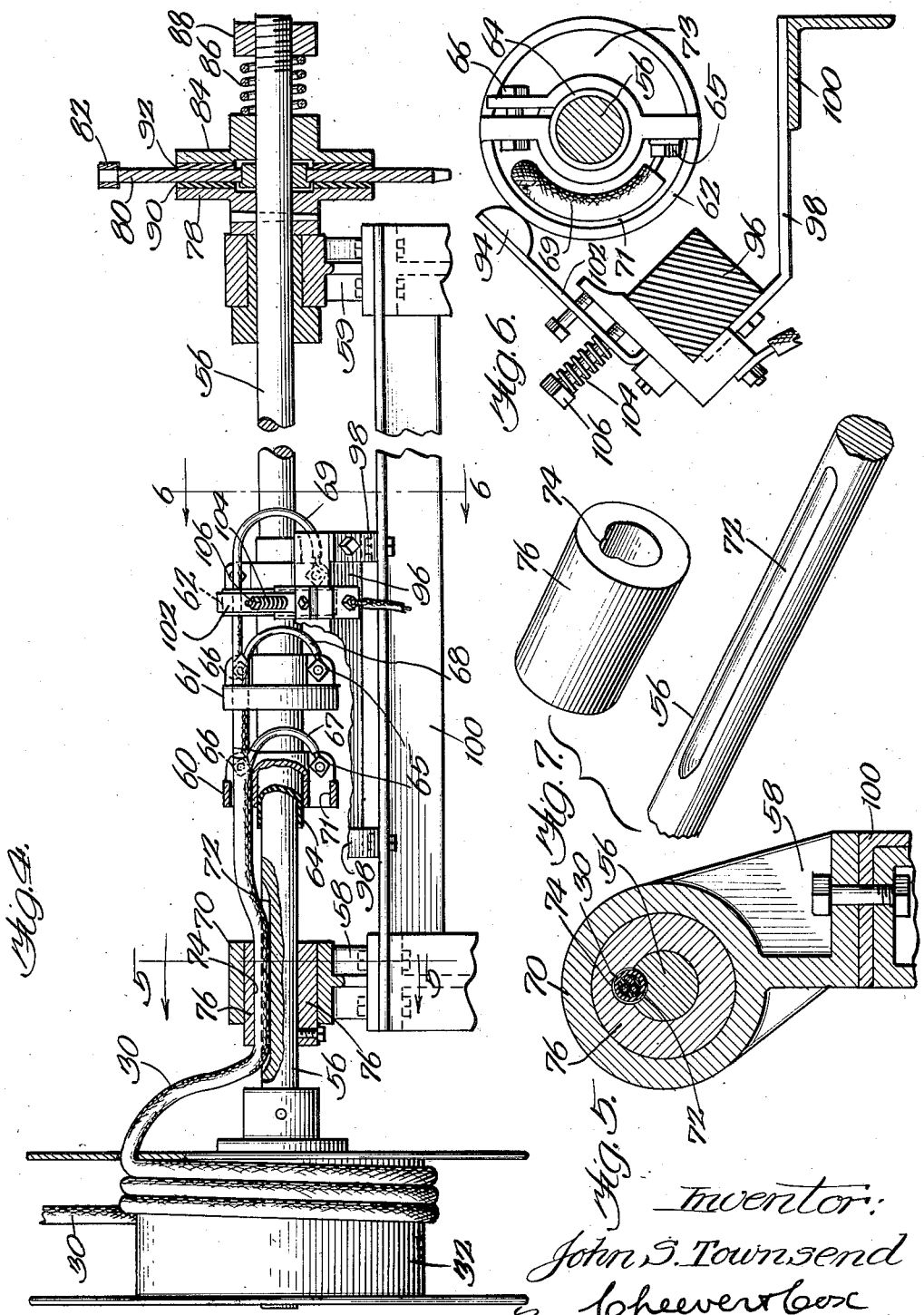

UNITED STATES PATENT OFFICE.

JOHN S. TOWNSEND, OF HARVEY, ILLINOIS, ASSIGNOR TO WHITING CORPORATION, OF HARVEY, ILLINOIS, A CORPORATION OF ILLINOIS.

POWER CABLE-REELING MECHANISM FOR SELF-PROPELLED MACHINES.

1,423,889.  Specification of Letters Patent.  Patented July 25, 1922.

Application filed April 13, 1921. Serial No. 461,164.

*To all whom it may concern:*

Be it known that I, JOHN S. TOWNSEND, a citizen of the United States, residing at Chicago, in the county of Cook and State of Illinois, have invented a certain new and useful Improvement in Power Cable-Reeling Mechanism for Self-Propelled Machines, of which the following is a specification.

This invention relates to cable control mechanism for supplying electric power current to a self propelled vehicle moving in a yard or building within a limited area about one fixed point from which the power current can be obtained. It is especially applicable for use in sand cutting and screening machines used in iron foundries for preparing previously used sand for reuse, and is for convenience, shown applied to one type of such machine shown and described and claimed in my prior United States patent application, Serial No. 380,714, filed May 12, 1920.

The objects of this invention are to provide a mechanism of this class with means preventing the cable tangling itself between the machine and the current delivery point in the room; to provide a cable reel which is overhung as to its bearing, therefore, providing ready access thereto from an adjacent operator's station to effectively connect the cable on the reel to collector devices at a point on its shaft beyond a fixed bearing over which the reel hangs, and to provide other features of construction which render the device thoroughly efficient and satisfactory in use.

The invention consists in means for attaining the foregoing and other desirable objects, which will be hereafter more fully set forth in the specification and claims.

Referring to the drawings in which like numerals designate the same parts throughout the several views, Figure 1 is a side elevation of such a machine having the preferred mechanism of this invention applied thereto.

Figure 2 is a plan view of the cable supporting means leading to the winding drum shown in Figure 1.

Figure 3 is a side view of the cable supporting means viewed from the line 3—3 of Figure 2.

Figure 4 is a plan view, partially in section, of the cable reel and collector mechanism taken from approximately the line 4—4 of Figure 1.

Figure 5 is a sectional detail view on the line 5—5 of Figure 4.

Figure 6 is a sectional end view on the line 6—6 of Figure 4.

Figure 7 is a perspective view of the shaft and enclosing sleeve taken on line 5—5, Figure 4.

The conventional sand cutting and screening machine of Fig. 1 includes a general frame 10 supported by wheels 12 carrying sand handling riddle 14 fed by the upwardly traveling buckets 16 of an elevator mechanism 18, in turn supplied with sand by cutting blades or ironmen 20 which move over the floor 22 of the foundry. Electric power must be supplied to the power transmission gearing system 24 to propel the machine over the floor, to drive the elevator, to drive the riddle, and to do other work in the machine not entering into this invention, and therefore not shown in detail. The problem is to provide cable means by which electric current can in all positions of the machine on the foundry floor 22, with reference to a fixed point in or near the ceiling of the room, be transmitted to rotate the motor 26 on shaft 28; specifically to do this through a current carrying cable 30 attached by its left hand end, beyond Figure 1, to a fixed point in the room.

In accomplishing this desired object a cable winding and tightening drum 32 combined with a cable guiding mechanism 34 is provided, the latter being adapted to insure free movement of the cable with reference to the drum without danger of the cables twisting or kinking as the machine changes its position.

Mechanism 34 is mounted upon a bracket 36 suitably secured to one of the uprights of the machine as by bolts 38. The free end of this bracket extends over the winding drum 32 and is there provided with a hollow bearing 40 (secured by screws 42), in which rotates a downwardly projecting stud 44 on the end of member 34. Member 34 and attached parts can, therefore, rotate in a complete circle on the bearing 40—44. Stud 44 is centrally perforated in passage 46 down which rope 30 passes to the winding drum 32. The body of member 34 is placed at an angle of about 45° to the rotating axis of stud 44 and carries two small cable carrying pulleys 48 guiding cable 30 from the vertical to horizontal, without permitting any sharp bend in the heavy copper cable. Upper pulley 48 is covered with a semi-circular cap 50 having in its central portion an elongated circumferential slot 52 through which cable 30 passes. This slot is open only the width between the flanges 54 of the pulley 48 with the result that this slotted cap 50 holds the cable 30 on the upper pulley 48 and between its flanges in all positions of rotation of the member 34 about the pivot 44—40.

Therefore, as the sand throwing machine travels around the room and changes its angular position, the cable supporting mechanism 34 always swings on the pivot 44 to correspond to the angular position of the machine in reference to the fixed point to which the left hand end of cable 30 is attached and the guard cap 50 in all such swinging movements positively retains the cable on the upper pulley 48, so that the reeling mechanism to be hereafter described can automatically draw the cable over the pulleys to closely fit on the reel 32 in all positions of the machine in the room.

In order that the cable reel 32 may be located at the side of the machine out of the way of riddle 14 and also that it be readily accessible to the operator of the machine on working station 51 and for other reasons unnecessary to detail, cable reel 32 is located on the end of a suitable shaft 56 which overhangs adjacent stationary bearing 58.

The shaft 56 is mounted in the bearing support 58 referred to and in another separately located bearing 59. Between these two bearings the shaft carries a plurality of collector rings 60, 61 and 62 insulated from the shaft by any suitable means, as for instance fiber sleeves 64 and are held in place by suitable means, such as bolts 65 and 66. In the particular case here illustrated three such collector rings are provided to take care of three phase alternating current delivered through the cable 30. The cable 30 is divided in proximity to these collector rings into separate branch wires 67, 68, and 69, each separately connected to its own collector bar by suitable connecting devices. In the particular case here illustrated each collector ring is made of two hollow parts provided with perforations 71 and 73 through one of which one or more of the wires 67—68—69 can pass as shown and the end of each proper one of such wires is attached to its collector under bolt 65 (Figure 6).

In order to keep the cable tight between the sand throwing machine and a fixed point in the room where it receives the electric current, it is necessary that shaft 56 rotate, first in one direction and then the other to rotate drum 32 which controls the play of the cable. As bearing support 58 is between the collector bars and the drum 32 means must be provided for preventing the cables tangling on this stationary support 58. This is accomplished by passing cable 30 through the bearing 70 proper on the support 58 by imbedding the cable in a suitable slot or notch 72 provided for it in the shaft 56 and in a corresponding registering notch 74 in a sleeve 76, which encases the shaft and cable at this point and rotates with the shaft in the bearing 70.

The result of this construction is that the portions of the cable, which contact the wheel 32, which are encased in the sleeve 76 and, which pass through and are connected to the collector rings all rotate in unison with the shaft without any possible tangling action on any stationary adjacent object.

The end of shaft 56 to the right of and beyond the bearing 60 (Figure 4) carries a clutch disk 78 fixed on the shaft; a rotatable clutch disk 80 adjacent thereto is driven by a sprocket chain 82 passing over it and constantly moved in a given direction by the power mechanism 24 whenever the motor 26 is in action; another clutch disk 84 is pressed against the disk 80 by spring 86 adjustably positioned by collar 88. There are friction washers 90 and 92 on opposite sides of the disk 80.

Chain 82 when operatively driven causes wheel 80 to rotate disk 78 to wind cable 30 on to reel 32 just as long as there is slack cable to be so wound, but when this operation is completed further rotation of the disk by the chain 82 merely causes disk 80 to slip on disk 78 and thus prevent breaking injury to the cable 30. The tension of the parts is such that cable 30 plays off from the drum 32 whenever the sand machine is running in the proper direction to require it. Under this condition the disks 78 and 80 actually rotate in opposite directions.

Current is taken from the collector rings 60—62 down to the motor 26 through separate cables each of which is provided with a collector finger mechanism 94 shown in detail in Figure 6. These fingers 94 are mounted by the mechanism shown on a stationary bar 96 running parallel to the shaft 56 and carried by a bracket 98 suitably rigidly attached to a stationary frame portion 100 on the machine. Each collector finger 94 is carried on a flexible member 102 adapted to be adjustably spring pressed to position on adjacent collector by a spring 104 controllable by screws 106.

As wires 67—69 pass through the collector rings they can not tangle on these brushes 94.

Having thus described my invention what I claim as new and desire to secure by Letters Patent, is:—

1. In mechanism of the class described, a bearing for a shaft, a shaft journaled in said bearing, a cable reel on said shaft on one side of said bearing, a cable having one part attached to said reel and another part attached to a point on the shaft beyond said bearing and a cable enclosing device inside said bearing and rotating in said bearing whereby all parts of the cable along the shaft rotate in unison with it.

2. In mechanism of the class described, a rotatable shaft, a cable reel carried by the shaft, a support for the shaft, a cable connected to the reel leading through said support to the other side thereof, and a sleeve enclosing the shaft and cable at said support rotatable in said support, for the purposes set forth.

3. In mechanism of the class described, a pair of shaft supporting bearings, a shaft extending through said bearings, a cable reel secured to said shaft overhanging one of said bearings, a set of collectors on said shaft between said bearings, a cable windable on said reel extending through a protecting device in the adjacent bearing, rotatable with the shaft, and connected for electrical work to said collector members in such manner that the shaft with cable attached can freely rotate.

4. In mechanism of the class described, a pair of spaced apart shaft bearings, a shaft journaled in said bearings, a plurality of collector rings on said shaft between the bearings, a hollow sleeve on the shaft inside of one shaft bearing, a cable reel on the shaft beyond said last mentioned bearing, an electric cable attached to said reel leading through said collar in the bearing and leading through perforations in the collector rings, means for attaching a wire from the cable to each collector ring, and means for rotating said shaft, the whole so arranged that the collector rings and the cable leading back to the reel rotate entirely clear of the shaft bearing and all other stationary obstructions.

In witness whereof, I have hereunto subscribed my name in the presence of a witness.

JOHN S. TOWNSEND.

Witness:
   VELMA GRIFFITH.